(12) United States Patent
Radjabli

(10) Patent No.: US 10,867,586 B1
(45) Date of Patent: Dec. 15, 2020

(54) VIRTUAL REALITY STREAMING MEDIA SYSTEM AND METHOD OF USE

(71) Applicant: Edgar Radjabli, Baltimore, MA (US)

(72) Inventor: Edgar Radjabli, Baltimore, MA (US)

( * ) Notice: Subject to any disclaimer, the term of this patent is extended or adjusted under 35 U.S.C. 154(b) by 0 days.

(21) Appl. No.: 16/694,458

(22) Filed: Nov. 25, 2019

Related U.S. Application Data

(60) Provisional application No. 62/849,441, filed on May 17, 2019.

(51) Int. Cl.
| | | |
|---|---|---|
| *G09G 5/00* | (2006.01) | |
| *G09G 5/373* | (2006.01) | |
| *G06F 3/01* | (2006.01) | |
| *H04N 21/81* | (2011.01) | |
| *H04N 21/4402* | (2011.01) | |
| *H04N 21/438* | (2011.01) | |
| *G06N 20/00* | (2019.01) | |
| *G06N 5/04* | (2006.01) | |
| *H04N 21/466* | (2011.01) | |

(52) U.S. Cl.
CPC ............ *G09G 5/373* (2013.01); *G06F 3/012* (2013.01); *G06N 5/04* (2013.01); *G06N 20/00* (2019.01); *H04N 21/438* (2013.01); *H04N 21/440263* (2013.01); *H04N 21/4662* (2013.01); *H04N 21/816* (2013.01); *G09G 2320/0261* (2013.01); *G09G 2340/0407* (2013.01); *G09G 2350/00* (2013.01)

(58) Field of Classification Search
CPC ........... G09G 5/373; G09G 2340/0407; G09G 2320/0261; G09G 2350/00; H04N 21/438; H04N 21/4662; H04N 21/816; H04N 21/440263; G06N 20/00; G06N 5/04; G06F 3/012
See application file for complete search history.

(56) References Cited

U.S. PATENT DOCUMENTS

| | | | |
|---|---|---|---|
| 2010/0097379 A1* | 4/2010 | Choi | ................. G06F 3/1446 345/428 |
| 2014/0240319 A1* | 8/2014 | Syed | ............. H04N 21/234363 345/428 |
| 2015/0070357 A1* | 3/2015 | Tahan | ....................... G06F 3/14 345/428 |
| 2015/0194128 A1* | 7/2015 | Hicok | ..................... G09G 5/36 345/428 |
| 2016/0086566 A1* | 3/2016 | Zhu | ..................... G06F 16/9577 345/428 |
| 2016/0379606 A1* | 12/2016 | Kollin | ................. G06T 3/4038 345/428 |
| 2018/0307310 A1* | 10/2018 | McCombe | ........ H04N 5/23229 |

* cited by examiner

*Primary Examiner* — Martin Mushambo

(57) ABSTRACT

A virtual reality experience system includes an environment with a viewing area; a datastream to be implemented into the viewing area by a display device to display the datastream in a virtual reality fashion; a down sampler device to receive the datastream, the down sampler device having one or more adaptive learning algorithms contained thereon, the down sampler is to perform the steps of receiving the datastream; predicting visual movement of a user related to the viewing area; determining a likely direct viewing direction by the user; and manipulating the datastream such that a high resolution stream is displayed in the likely direct viewing direction and a low resolution image is displayed in a remainder of the viewing area; the down sampler reduces the overall bandwidth need for portraying a virtual reality experience to the user.

4 Claims, 5 Drawing Sheets

VIRTUAL REALITY STREAMING MEDIA SYSTEM AND METHOD OF USE

BACKGROUND

1. Field of the Invention

The present invention relates generally to virtual reality systems, and more specifically, to a virtual reality streaming media system for creating a data feed that allows for the rapid transfer of data to facilitate the construction and display of an immersive environment.

2. Description of Related Art

Virtual reality systems are well known in the art and are effective means to create digital environments that are immersive and interactive. Commonly, these environments surround a user so that from any point of view the simulation is present. For example, live events such as concerts, sporting events, parades, or being present at Times Square on New Year's Eve convey strong emotions and are commonly broadcast in ever increasing resolution, detail and quality. Virtual reality systems allow these broadcasts to be more immersive and enjoyable.

One of the problems commonly associated with virtual reality systems is their limited efficiency. For example, the network capacity to transmit the data required to construct a virtual reality experience in high definition is excessive and restricts the possibility of their transmission.

The challenge is that the ability to look anywhere in 360 degrees requires fully panoramic video, which are very large, and often require 4K resolution. In addition, a VR headset typically works in 3D, meaning that a panoramic video is needed for each eye, thereby further increasing the load of data required. It is well known that for the most lifelike experience, 4K FOV is required, which is 150 MBS for a $3^{rd}$ experience. Accordingly, an estimated bandwidth necessary would be even higher to ensure stability of the video overhead.

Accordingly, it is desirable to provide a system that could reduce the overall data load that will be transmitted and displayed, thereby allowing for a virtual reality system to function on a lower bandwidth, thereby making such an experience more accessible to the public.

Accordingly, although great strides have been made in the area of virtual reality systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
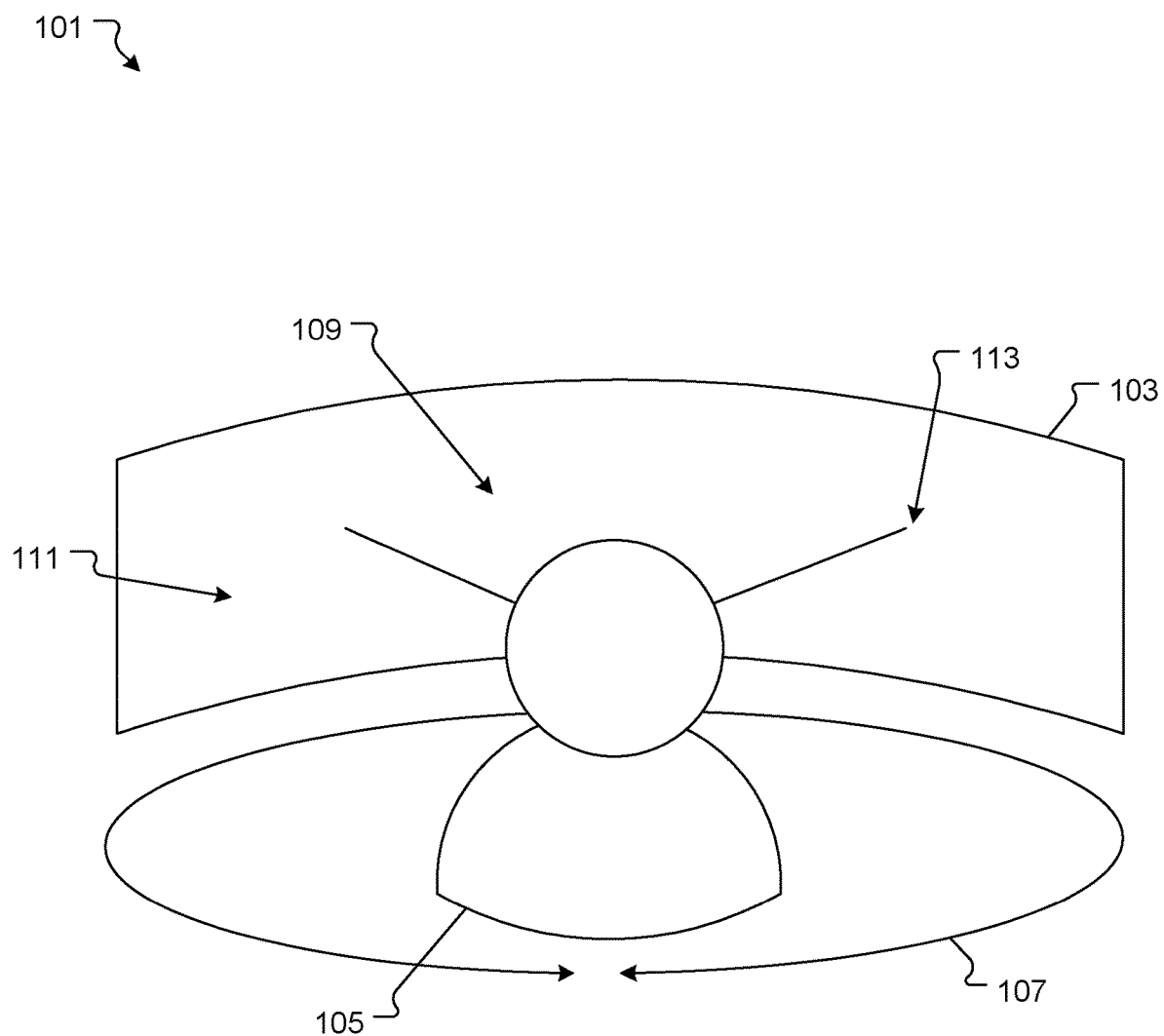
FIG. 1 is a front view of a virtual reality streaming media system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional virtual reality systems. Specifically, the invention of the present application allows for minimizing the content streaming requirement of a virtual reality video transmission. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of a virtual reality streaming media system in accordance with a preferred embodiment of the present application. It will be appreciated that system 101 overcomes one or more of the above-listed problems commonly associated with conventional virtual reality systems.

In the contemplated embodiment, system 101 includes environment 103 as seen by a user 105. It is contemplated that the environment surrounds 107 the user 105 or is immersive. The user 105 has a viewing area 109 of the environment 103 that they are able to take in with their eyes that results in a remainder 111 that is not actively viewed by the user 105. It is further contemplated that a boundary 113 of the viewing area 109 and the remainder 111 includes parts of the environment that are seen in lower detail.

Figure 2:
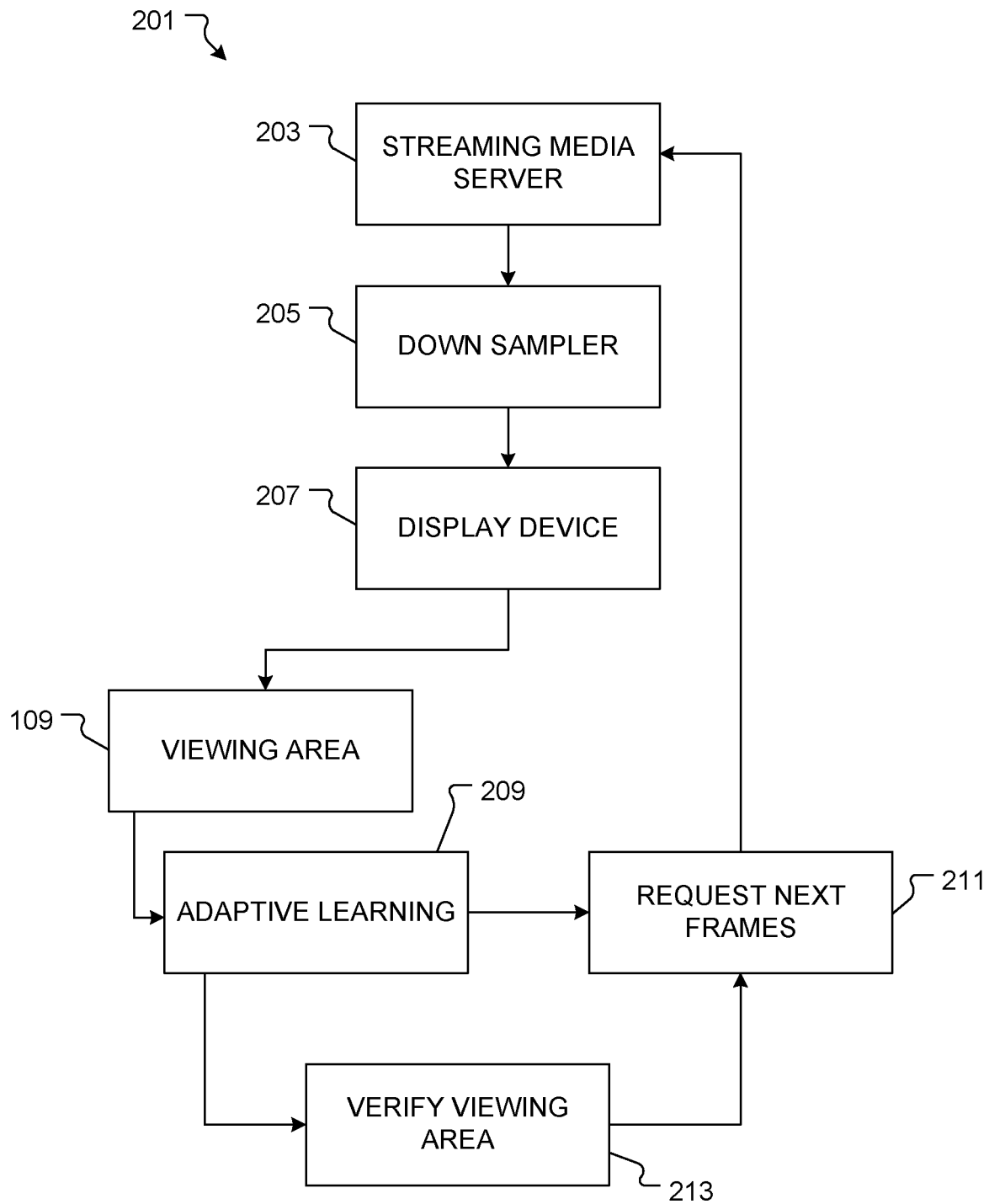
FIG. 2 is is a diagram of the system of FIG. 1.

The system 101 further includes a data stream 201 as depicted by FIG. 2. The stream 201 initiates with a media server 203 that then passes through a down sampler 205 that is configured to reduce or eliminate the content that is not viewed or viewed directly by the user 105. The data stream 201 is then sent to a display device 207 where the user 105 is able to participate in the virtual reality video as transmitted in the data stream 201. Adaptive learning 209 and other techniques are employed to ensure that the user 105 is experiencing the virtual reality video at its fullest detail, quality and resolution. The adaptive learning 209 requests the next frames 211 from the streaming media server 203 that pertain the data stream 201. Additionally, the adaptive learning 209 verifies 213 that the viewing area is correct for the behavior of the user 105 and other data inputs.

It is contemplated that the virtual reality video could be continuous in nature or that is could represent an interactive visual presentation for entertainment or education. The virtual reality video could also be a mixture of artificial images laid over real or actual visual input received by the user 105, also known as augmented reality. The concepts of the material included or that make up the virtual reality video are not intended to limit the scope thereof; they are provide as examples only.

It is further contemplated that the adaptive learning 209 could alter the viewing area of a virtual reality video prior to any action of the user based on an expected response from the user for future segments of the video.

It should be appreciated that one of the unique features believed characteristic of the present application is that the system reduces the total data transmission requirements by placing the focus on the viewing area 109 so that the user 105 is oblivious to the lower rendered areas or the non-rendered areas.

Figure 3:
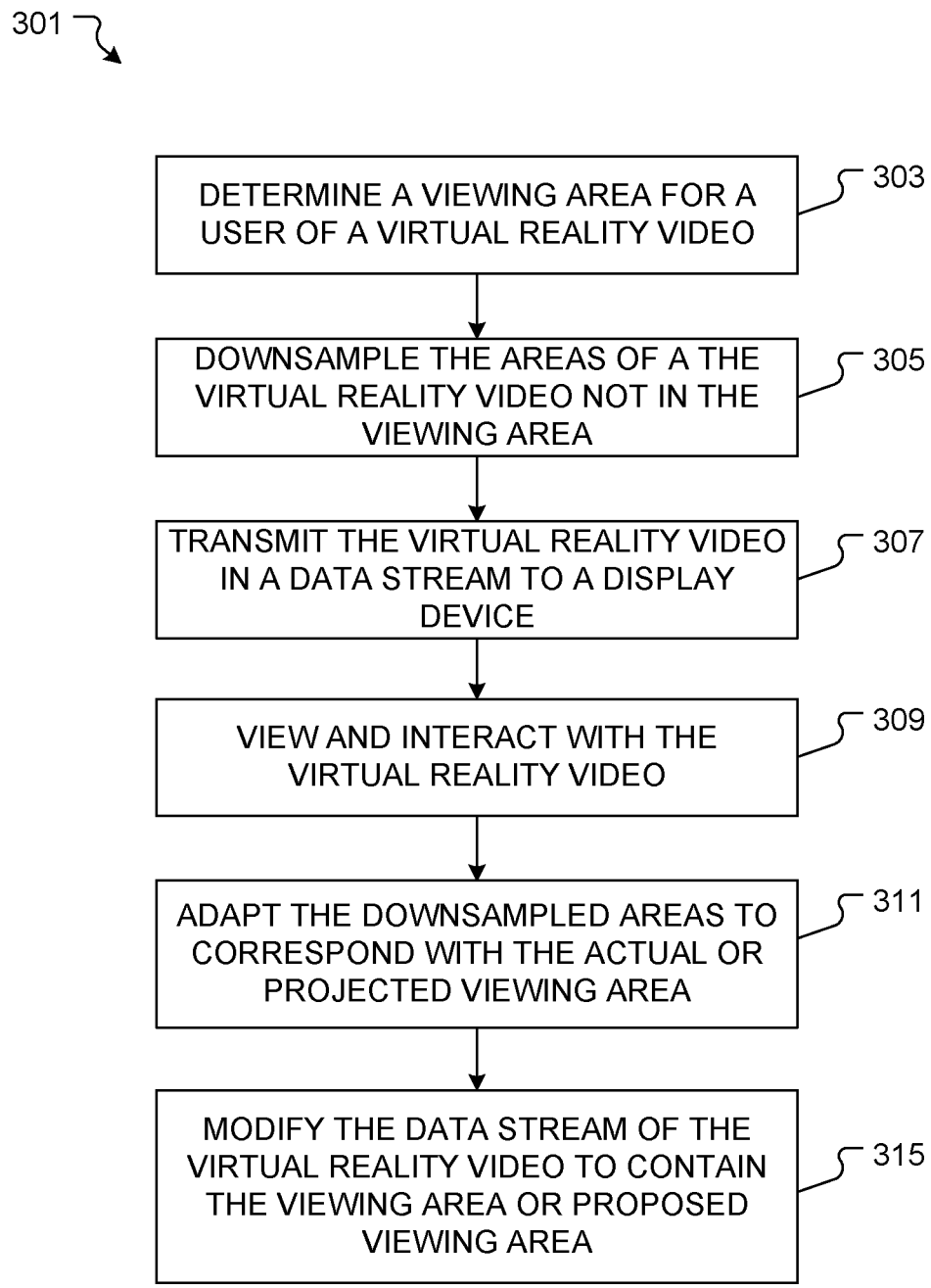
FIG. 3 is a flowchart of the preferred method of use of the system of FIG. 1.

Referring now to FIG. 3 the preferred method of use of the system 101 is depicted. Method 301 includes, determining a viewing area for a user of a virtual reality video 303, downsampling the areas of a the virtual reality video not in the viewing area 305, transmitting the virtual reality video in a data stream to a display device 307, viewing and interacting with the virtual reality video 309, adapting the downsampled areas to correspond with the actual or projected viewing area 311 and modifying the data stream of the virtual reality video to contain the viewing area or proposed viewing area 313.

Figure 4:
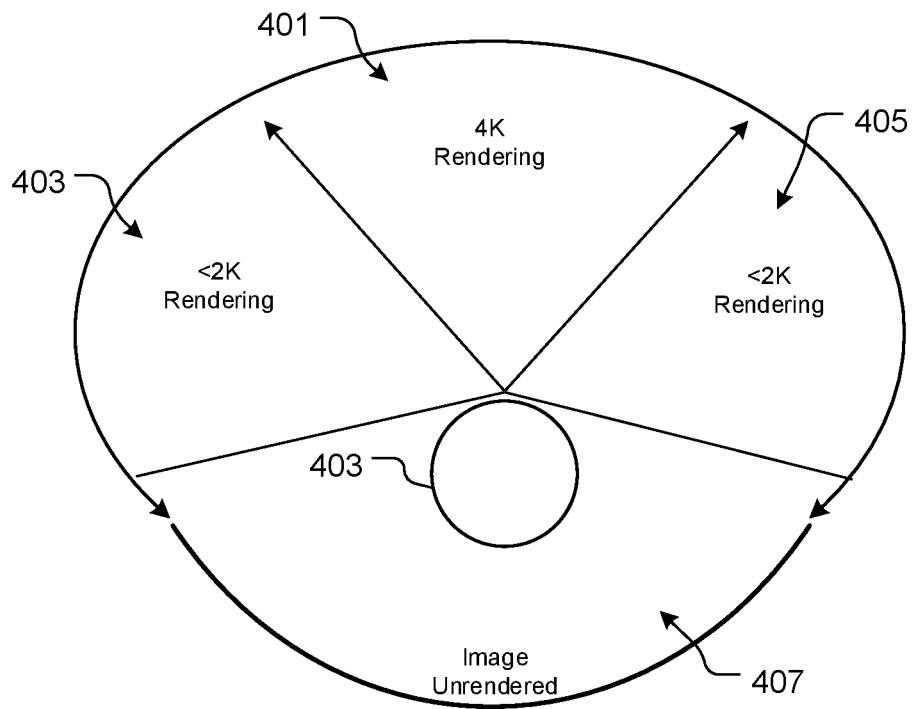
FIG. 4 is a top view showing display areas as contemplated in the present invention.

In FIG. 4, a top down view depicts a plurality of display areas as contemplated in the present invention. As shown, the system is configured to predict a likely direct viewing area 401 which will be displayed in the highest resolution. This area is determined based on movements of the user 403, which can be collected via one or more device, such as a headset, wherein the one or more adaptive learning algorithms updates the streaming with every move of the user. Further, as shown, the system can include lesser resolution areas 405, 407, which are determined to be within the user's vision, but in the user's peripheral vision. These areas, as shown, will be displayed but displayed at a lower resolution when compared to the direct area. It should be appreciated that the system will be configured to increase the resolution as needed in these areas based on movements of the user. Further, as shown, the system can include an image unrendered area 409, which is behind the user and invisible to the user. Again, it should be appreciated that the display device, down sampler device, and adaptive learning technologies can be used to determine this area.

Figure 5:
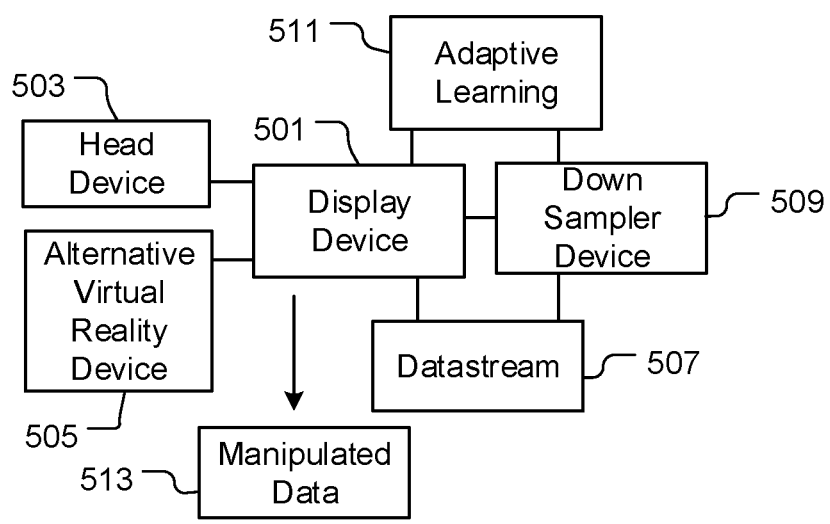
FIG. 5 is a schematic that further shows the essential features of the system of the present invention.

In FIG. 5, a simplified schematic depicts the features necessary for the system of the present invention. As shown, the system includes a display device 501 which may be a head device 503 or any other virtual reality device 505. The display device 501 is configured to display the victual reality experience for the user, and therefore, is in data communication with a datastream 507. The datastream 507 is configured to be processed and manipulated by the display device 501 and/or a down sampler device 509 with one or more adaptive learning algorithms 511. It should be appreciated that the display device and down sampler device can be a single unit configured to process data. During use, the system is configured to process the datastream 507 into a manipulated datastream 513 for display in the environment with varying resolutions.

Figure 6:
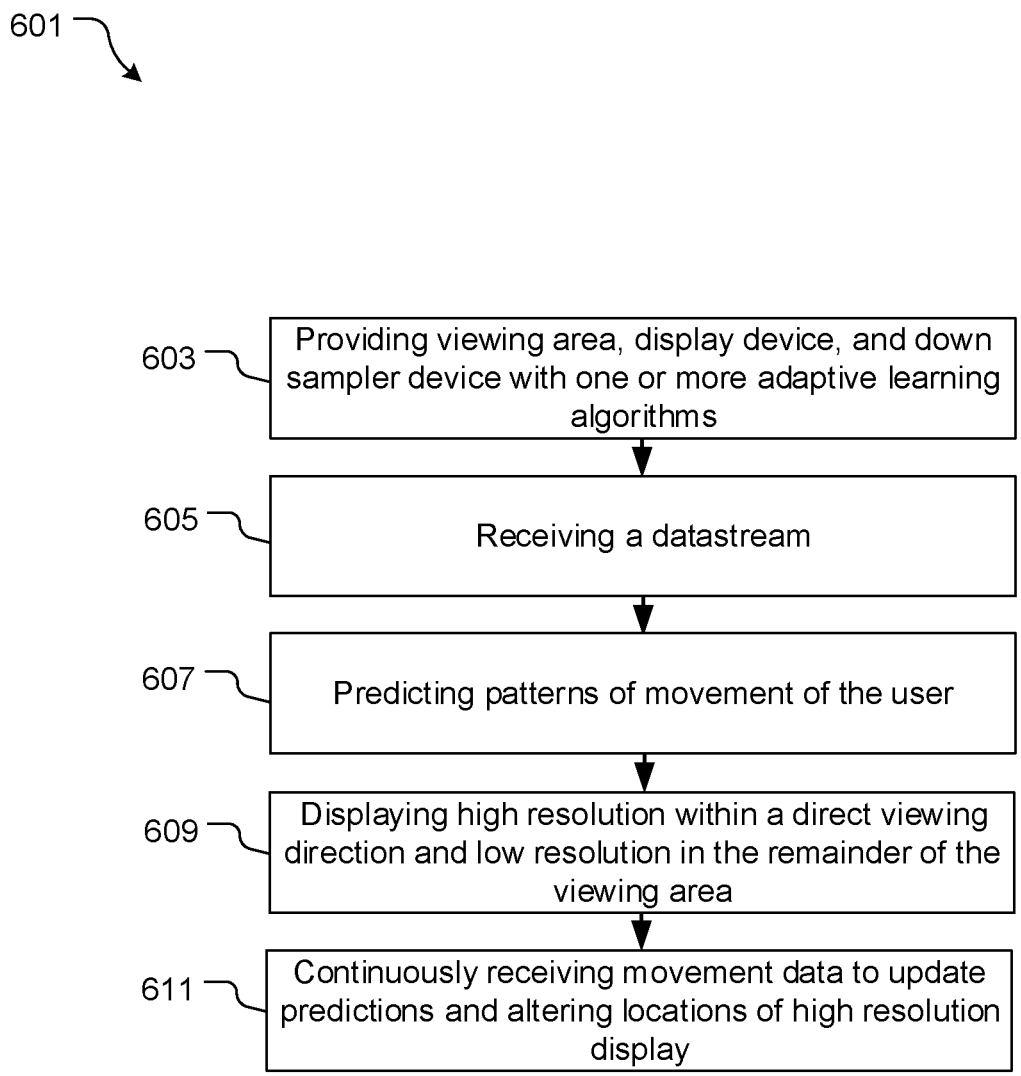
FIG. 6 is a flowchart of the data processing associated with the system of the present invention.

In FIG. 6, a flowchart 601 further depicts the method of the system of the present invention. During use, a viewing area, display device, down sampler device, and the one or more adaptive learning algorithms are provided, as shown with box 603. A datastream is received, wherein the datastream is manipulated based on predictions of user movement, wherein the manipulation results in a display of a direct viewing area, a low resolution viewing area, and possibly a no image area, as shown with boxes 605, 607, 609. The system is configured to continuously receive movement data of the user, which will be used to further refine how the datastream is manipulated and displayed, as shown with box 611.

It should be appreciated that another unique feature of the present invention is the ability to predict a next move of the user, which will allow the display device to create a display in that area of full resolution, thereby making the transition for the user from one direction to another seamless. For example, the system can know that a user is not expected to look into areas of little to no activity, but will almost certainly look to areas with loud noises and the like. The system will take these elements into consideration when predicting the user's next move. As the system continues to communicate with many users, the prediction for each datastream will improve further, thereby creating a seamless user experience. This occurs all while significantly compressing the video size, thereby decreasing the bandwidth requirements and cost.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A virtual reality experience system, comprising:
an environment with a viewing area;
a datastream configured to be implemented into the viewing area by a display device configured to display the datastream in a virtual reality fashion;
a down sampler device in data communication with the display device and configured to receive the datastream, the down sampler device having one or more adaptive learning algorithms contained thereon, wherein the down sampler is configured to perform the steps of:
 receiving the datastream;
 predicting visual movement of a user related to the viewing area;
 determining a likely direct viewing direction by the user; and
 manipulating the datastream such that a high resolution stream is displayed in the likely direct viewing direction and a low resolution image is displayed in a remainder of the viewing area;
wherein the down sampler reduces the overall bandwidth need for portraying a virtual reality experience to the user.

2. The system of claim 1, wherein the display device is a head display configured to track positions of the user's head.

3. The system of claim 1, wherein the down sampler device creates a predictive pattern associated with movement of the user.

4. A method of reducing bandwidth of a virtual reality datastream, the method comprising:
 providing a viewing area for a virtual reality experience for a user;
 providing a display device to the user, the display device configured to implement a datastream within the viewing area for the user;
 providing a down sampler device with one or more adaptive learning algorithms in data communication with the display device and configured to manipulate the datastream;
 predicting patterns through the one or more adaptive learning algorithms related to head movement of the user to determine a likely direct viewing direction of the user; and
 manipulating the datastream such that a high resolution stream is provided in the likely direct viewing direction and a low resolution stream is provided in a remainder of the viewing area.

* * * * *